United States Patent Office.

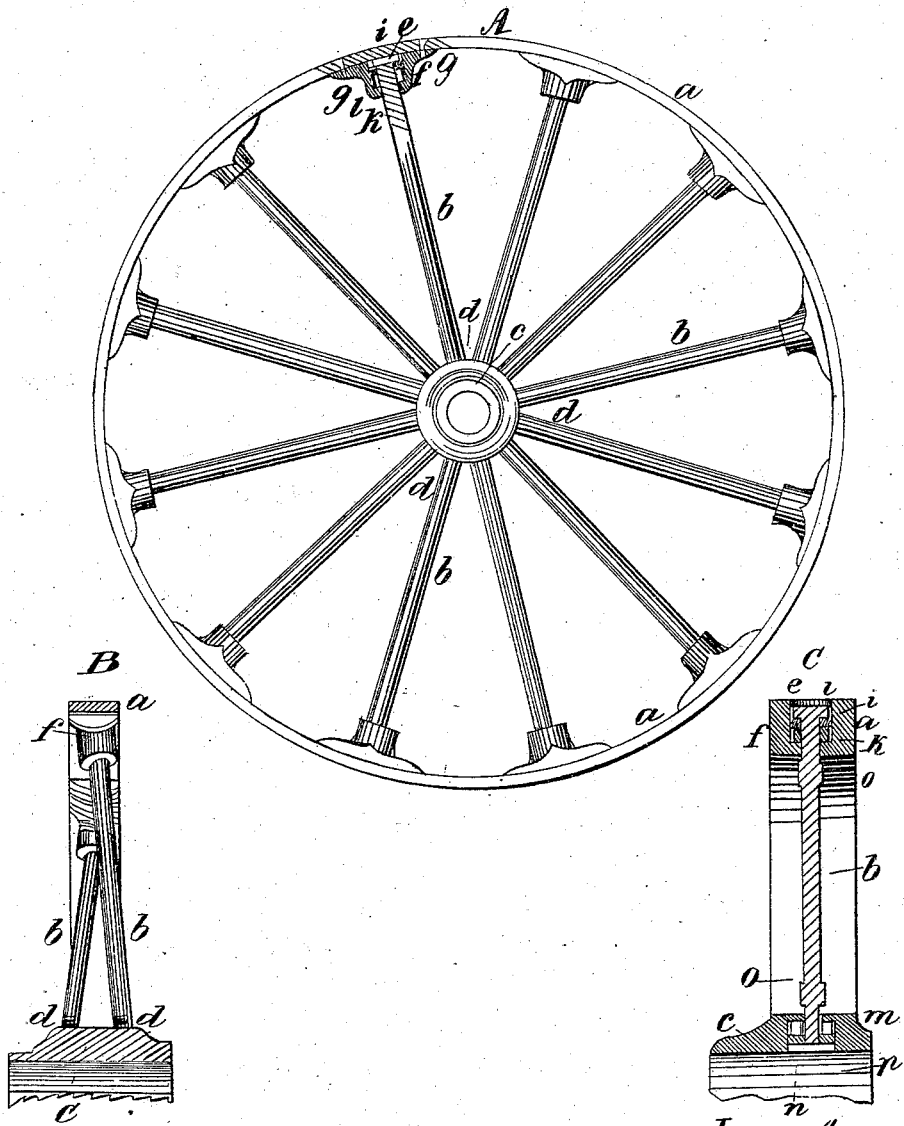

JOSEPH M. COOMBS, OF BOSTON, MASSACHUSETTS, ASSIGNOR THROUGH MESNE ASSIGN-
MENTS TO GEORGE W. CHIPMAN AND JOHN RADDIN, OF LYNN, MASSACHUSETTS.

Letters Patent No. 63,705, dated April 9, 1867.

---

IMPROVEMENT IN CARRIAGE-WHEELS.

---

The Schedule referred to in these Letters Patent and making part of the same.

---

TO ALL WHOM IT MAY CONCERN:

Be it known that I, JOSEPH M. COOMBS, of Boston, in the county of Suffolk, and State of Massachusetts, have invented Improved Carriage-Wheels; and I do hereby declare that the following, taken in connection with the drawings which accompany and form part of this specification, is a description of my invention sufficient to enable those skilled in the art to practise it.

The invention relates to the manner of rendering carriage-wheels elastic, to save the carriage body from the effects of jars and concussions produced by movement of the carriage over rough ground and pavement, and against obstacles.

United States Letters Patent No. 48,207 were granted on the thirteenth day of June, A. D. 1865, on an improved carriage-wheel. In such wheel there is interposed between the outer end of each spoke and the felloe a cushion or packing of rubber or other elastic material, so that any pressure from the felloe to the hub, in the line of the spoke, and tending to compress the felloe towards the hub, was received directly against and borne by the rubber cushion. Such construction, however, though imparting to a considerable extent the desirable elasticity to the wheel, is objectionable, in that while there is a provision for contraction of the wheel from the bearing surface of the tire or felloe to the hub, there is no provision for a compensating expansion of the wheel from the hub to the surfaces at right angles to the radial line of pressure.

The object of my invention is to remedy this defect by so arranging cushions or springs in connection with the spokes that the concussive pressure and the weight of the carriage body tending to drive the felloe towards the hub are borne by cushions acted against by expansion of the sides of the wheel.

It is this construction that constitutes my invention, and the drawings represent a wheel embodying the same, A showing an elevation with a sectional view of one of the spokes, and B a radial section.

$a$ denotes the felloe, which is shown as a continuous metal rim, though it may be made in sections, and of wood or other material, and may be surfaced by a tire in the usual manner. $b\ b$ are the spokes, $c$ the hub. One end of each spoke has a screw-thread, $d$, by which it is secured to the hub, and the other end has a head, $e$. This end of the spoke plays within a metal box, $f$, which box has flanges, by which it is screwed to the inner surface of the felloe, as seen at $g$. The end of the spoke does not abut against the felloe, but has an open space, $i$, left between such end and felloe surface. Between the inner side of the head or the flange formed by said head, and the flange formed by the inner part of the box, is a rubber or other spring, $k$, surrounding the spoke, (a washer, $l$, being interposed between the head and rubber, as seen at A,) so that if any section of the wheel is expanded from the hub to the felloe, the strain is received by the pressure of the head of the spoke against the spring or cushion. Each spoke is adjusted in position, or so as to strain the head against the spring, by the screw which confines it to the hub.

The action of the wheel is as follows: As the pressure exerted in the line of any spoke, from the felloe to the hub, tends to compress the felloe towards the hub, such compression expands the felloe at the sides of the wheel and draws the heads of the spokes at such sides against the springs or cushions, and thus preserves the carriage from severe jolts, adding greatly to its capabilities of wear, and rendering it a very easy and comfortable vehicle.

In the modification shown at C, the end of the spoke applied to the hub has a nut, $p$, and a rubber or spring cushion, $m$, applied to it, a square socket or recess, $n$, being made in the hub into which the end of the spoke extends, so that when the wheel expands from the hub to the felloe, the strain is borne at both ends of the spoke, the spoke having square parts, $o$, to which a wrench or wrenches may be applied to tighten the spoke.

By my construction I obviate the objections and increase the advantages existing in the construction shown in the patent to which reference has been made, and the arrangement of the springs is more simple and reliable, and the wheels much stronger than in such patented construction. The improvements are alike applicable to light carriages and heavy wagons and cars.

I claim an elastic wheel, constructed with a provision for contraction of the bearing surface of the felloe towards the hub, when also so constructed that the expansion of the sides of the wheel produced by such contraction is resisted by springs, substantially as set forth.

JOSEPH M. COOMBS.

Witnesses:
J. B. CROSBY,
FRANCIS GOULD.